(12) United States Patent
Ellerbrok

(10) Patent No.: US 6,443,483 B2
(45) Date of Patent: Sep. 3, 2002

(54) GAS BAG MODULE

(75) Inventor: Norbert Ellerbrok, Rudersberg (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/751,852

(22) Filed: Dec. 29, 2000

(30) Foreign Application Priority Data

Dec. 30, 1999 (DE) ..................................... 299 22 987 U

(51) Int. Cl.⁷ .............................................. B60R 21/20
(52) U.S. Cl. .................................. 280/728.3; 280/743.2
(58) Field of Search ............................. 280/728.3, 731, 280/732, 743.2

(56) References Cited

U.S. PATENT DOCUMENTS

| | | | |
|---|---|---|---|
| 3,794,349 A | | 2/1974 | Fuller |
| 4,911,471 A | | 3/1990 | Hirabayashi |
| 5,004,266 A | * | 4/1991 | Miller et al. ............ 280/743.2 |
| 5,238,264 A | | 8/1993 | Barnes |
| 5,775,721 A | * | 7/1998 | Grout ..................... 280/728.3 |
| 6,099,027 A | * | 8/2000 | Shirk et al. ............. 280/728.3 |

FOREIGN PATENT DOCUMENTS

| | | |
|---|---|---|
| DE | 2320272 | 11/1973 |
| EP | 0695671 | 2/1996 |
| JP | 4-310450 | * 11/1992 |

* cited by examiner

*Primary Examiner*—Peter C. English
(74) *Attorney, Agent, or Firm*—Tarolli, Sundheim, Covell, Tummino & Szabo L.L.P.

(57) ABSTRACT

The invention relates to a gas bag module, comprising a module cover which has at least one opening flap movable upon activation of the module. An axis is provided relative to which the opening flap moves when it is opened, and a tether is provided between the at least one opening flap and a part of the gas bag module. In an open condition of the module cover the opening flap is fixed on the one hand to the module by means of the tether and on the other hand is fixed to the module cover via the axis. The axis and the tether are arranged with respect to the opening flap in such a manner and the opening flap has such a strength that its geometry is changed by the tether when it is swivelled open so that the opening flap moves outwardly by a smaller amount than without the tether.

12 Claims, 2 Drawing Sheets

GAS BAG MODULE

TECHNICAL FIELD

This invention relates to a gas bag module comprising a module cover.

BACKGROUND OF THE INVENTION

Known module covers usually swing to the outside when they are opened, the opening flap having a relatively large swiveling radius. This swiveling radius might possibly hurt the occupant sitting too close to the gas bag module, in particular in the case of a so-called out-of-position (OOP) sitting posture of the occupant or in case of a second crash.

BRIEF SUMMARY OF THE INVENTION

The invention provides a gas bag module which has an opening flap that moves less far toward the occupant when it is opened. This is achieved in a gas bag module which comprises a module cover which has at least one opening flap movable upon activation of the module. An axis is provided relative to which the opening flap moves when it is opened, and a tether is provided between the at least one opening flap and a part of the gas bag module. In an open condition of the module cover the opening flap is fixed on the one hand to the module by means of the tether and on the other hand is fixed to the module cover via the axis. The axis and the tether are arranged with respect to the opening flap in such a manner and the opening flap has such a strength that its geometry is changed by the tether when the opening flap swivels open. The opening flap moves outwardly, i.e. toward a passenger compartment by a smaller amount than without the tether. In the gas bag module according to the invention it is the function of the tether to change the geometry of the module cover. This is achieved in that a force, acting on the opening flap e.g. by the deploying gas bag or by some other means, produces a counterforce in the axis and in the tether. The opening flap is preferably bent or even kinked by influencing these forces and counterforces, and in this condition it is moved away from the deployment opening for the gas bag. Caused by the change in the geometry of the opening flap, the latter requires less space during the opening process. When the axis for instance is a pure swiveling axis, the opening flap will have a smaller swiveling radius than without the tether. The term swiveling radius may also be inaccurate in this context, because when the opening flap changes its geometry during the opening movement, any path of movement can be generated for the relevant outer edge of the opening flap.

To ensure that these paths of movement can possibly be predetermined, one or more bending or kinking points in the opening flap have been predefined, which can for instance be produced by a kind of film hinge or some other weakened portions in the cover.

In accordance with the preferred embodiment, the axis is a stationary swiveling axis, which is formed by a film hinge. This formation of the axis is very inexpensive.

The gas bag will usually urge the opening flap, which is formed integrally at the module cover, to the outside and tear open the module cover. It may possibly deliberately press or move the tether such that it causes the geometric deformation of the opening flap. To ensure that this process, namely tearing open, moving the opening flap and the large enough introduction of force to cause the change in geometry, is effected in a predeterminable way, one design of the invention provides a deployment limiting means at the gas bag, which acts at the beginning of the deployment process and directs portions of the gas bag to predetermined points of the tether. The deployment limiting means may for instance be a strap constricting the folded gas bag, which strap will tear during the deployment process, but at the beginning of the deployment process predetermines the initial deployment direction.

In the preferred embodiment, the tether is so short that it exerts a restraining force on the opening flap, which restraining force leads to the change in the geometry of said opening flap, when the deployment opening for the gas bag is open for 20 to 50 percent. This is based on the opening cross-section. It should thus be ensured that the opening flap is bent or kinked already in the initial phase of the opening movement.

In the preferred embodiment, the module cover has an emblem on its outside, the tether being mounted to the inner side of the covering flap in the region of the emblem or so as to be incorporated therein; thus, the tether being able of directly retaining the heaviest part of the cover.

DETAILED DESCRIPTION OF THE PREFERRED EMBODIMENTS

Figure 1:
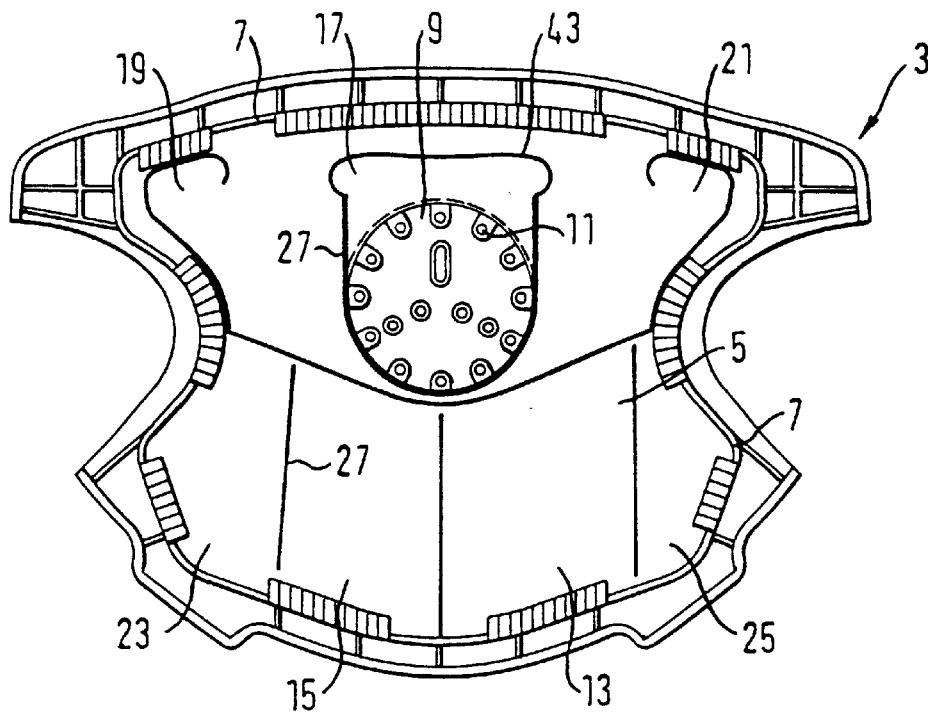
FIG. 1 shows a bottom view of a module cover as part of the gas bag module according to the invention.

FIG. 1 represents a module cover for a steering wheel gas bag module. The module cover 3 has a front wall 5, which faces the driver, and a surrounding side wall 7. On the outside of the front wall 5 an emblem 9 is mounted, which is represented in broken lines. On the rear side, a plurality of rivets 11 for fixing the emblem 9 can be seen. The module cover has a plurality of opening flaps 13 to 25 defined by tear lines (weakened portions in the module cover), which are provided with the reference numeral 27. At the transition of the opening flaps 13 to 25 to the side wall 7 film hinges 31 are provided, which serve as axes, more precisely as swiveling axes.

The opening flap 17 is the one to which the emblem 9 is fixed and which by no means should come in contact with the occupant. The opening flap 17, which extends from the two parallel portions of the tear line 27 up to the side wall 7, has a predetermined bending or kinking point 43 parallel to the associated axis 31 of the opening flap 17 in the area between the side wall 7 and the emblem 9, which kinking point has been formed by a weakened portion of the opening flap 17 in a line-shaped area.

Figure 2:
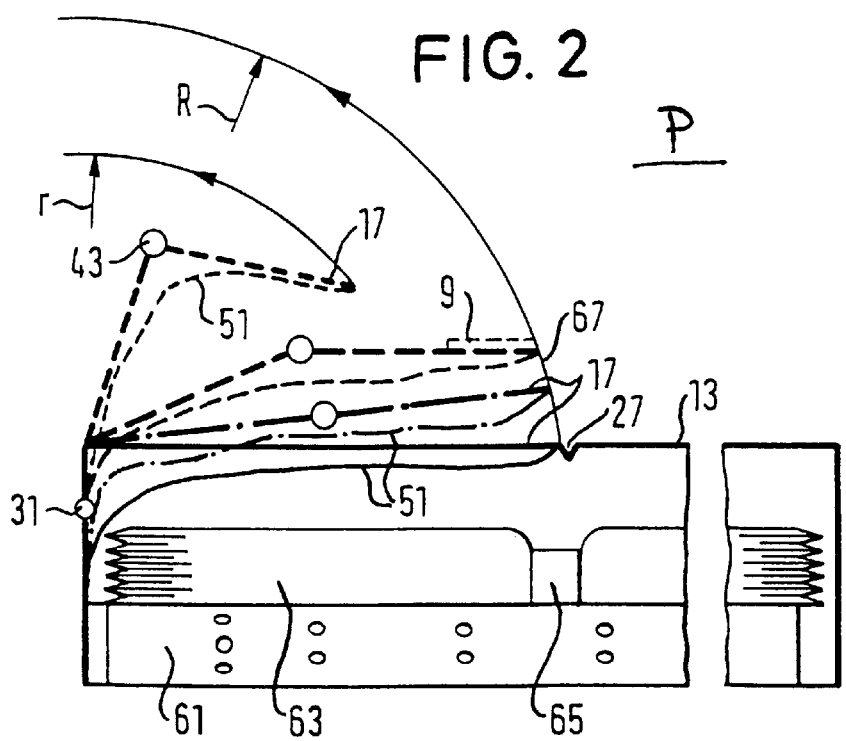
FIG. 2 shows a stylized cross-sectional view of a gas bag module according to the invention, which has a module cover as shown in FIG. 1.
Figure 3:
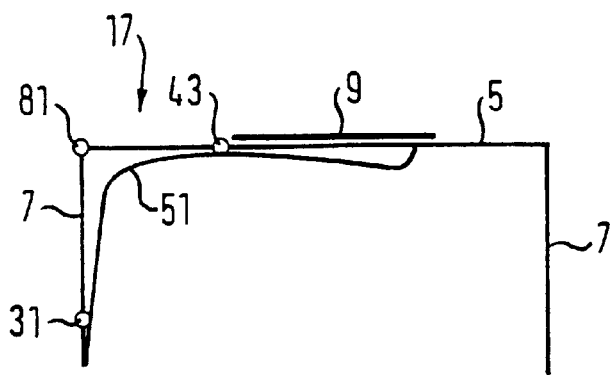
FIG. 3 shows a stylized cross-sectional view of a second embodiment of the gas bag module according to the invention, with the cover closed.

The rivets 11 not only serve to mount the emblem 9 at the front wall 5, but also a tether 51, which is shown in FIG. 2, at the opening flap 17. FIG. 2 furthermore illustrates the gas generator 61 and the folded gas bag 63 as parts of the gas bag module. In the area below the tear line 27, i.e. at the transition between the opening flaps 13, 15 and the opening flap 17, the gas bag 63 has a strap 65 surrounding it, which strap acts as deployment limiting means and will tear during the deployment process, as will be explained below. In the left-hand half of the gas bag module represented in FIG. 2, several phases during the opening movement of the opening flap 17 are shown.

Upon activating the gas generator 61, gas will enter the gas bag 63 and the gas bag will unfold. The strap 65 divides the gas bag 63 in two halves, so that at the beginning of the deployment process these two halves will unfold separately, namely toward the center of the respective opening flap 17 or 13, 15. Due to the pressure applied onto the opening flaps the front wall 5 will tear in the region of the tear lines 27, and the opening flaps are formed. At the beginning, the opening flap 17 swivels as a rigid unit about its swiveling axis 31 toward the passenger compartment, with respect to FIG. 2 in upward direction. After a small swiveling angle, not even half the deployment opening 67 is open, it already happens that the gas bag exerts such a force on the tether 51 that the opening flap 17 kinks in the region of the kinking point 43. The opening flap 17 then swivels further in anti-clockwise direction, but this swivel movement takes place in the kinked condition. Due to such kinking, the opening flap 17 moves outwardly, i.e. toward the driver or the passenger compartment P by a smaller amount r than without kinking. When the opening flap 17 is opened about the swiveling axis 31, the swiveling radius r thereof is thus smaller in the present case than the amount (in the form of the swiveling radius R) by which the opening flap 17 would move without kinking during the opening movement. This means that the hazard potential for the occupant is also smaller. The location of the swiveling axis 31, the length of the tether 51 and its attachment to the opening flap 17 on the one hand and to the gas bag module on the other hand (e.g. to the module cover or a housing part such as a gas generator mounting plate) as well as the direction of deployment of the gas bag 63 and the stability of the opening flap must be matched with each other such that the opening flap 17 is kinked during the opening process and thus undergoes a change in its geometry.

A kinking of the opening flap need not necessarily be effected, and it is possibly sufficient when the same is bent. Moreover, the path of movement described by the outer end of the opening flap 17 during the opening process is not a circle, but preferably a kind of elliptical path. In this case, the reference numeral r indicates the largest distance which a portion of the opening flap 17 has from the swiveling axis 31 during the opening process. In the course of the further deployment of the gas bag 63 the strap 65 will finally tear, and the gas bag can fully deploy and emerge from the then completely exposed deployment opening 67.

Figure 4:
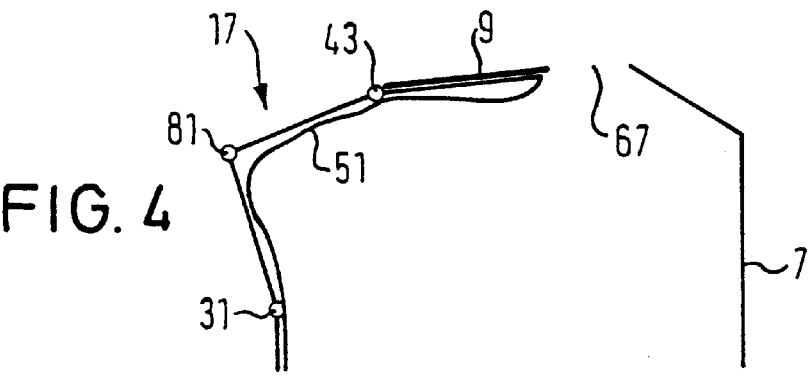
FIG. 4 shows the gas bag module in accordance with FIG. 3, shortly after the beginning of the opening process.
Figure 5:
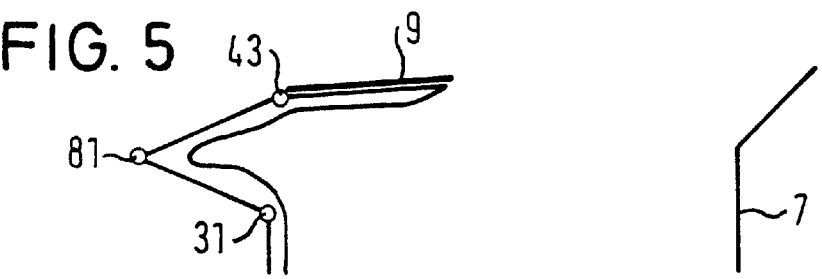
FIG. 5 shows the gas bag module in accordance with FIG. 3 with a farther open opening flap.
Figure 6:
FIG. 6 shows the gas bag module in accordance with FIG. 3 with completely open opening flap.

In the embodiment shown in FIGS. 3 to 6, a plurality of kinking points is provided, i.e. between the kinking point 43 and the swivel axis 31 there is defined a second kinking point 81 in the opening flap 17 in the region of the transition between the front wall 5 and the side wall 7. Due to the additional kinking point 81, it is possible that the opening flap 17 is moved even less far toward the occupant, when it is opened. The individual phases of the opening movement are represented in FIGS. 4 to 6. With this embodiment, too, portions like the halves of the gas bag 63 described above with reference to FIG. 2 exert forces on the tether 51 at predetermined times at predetermined points, which forces lead to the kinking of the opening flap 17. As is shown in FIG. 4, the kinking point 81 is practically not employed and the kinking point 43 is hardly employed at the beginning of the opening process, so that the opening flap 17 swivels to the outside about the swiveling axis 31 virtually without a change in geometry. When the deployment opening 67 opened less than 50 percent of the completely open state (FIG. 6), a kinking at the kinking point 43 can clearly be recognized (FIG. 5).

The amount by which the opening flap provided with two kinking points moves toward the occupant can again distinctly be reduced by this embodiment. Moreover, it is not absolutely necessary that the gas bag presses onto the tether 51 during deployment and leads to the kinking of the opening flap 17. The tether 51 may just as well be very short, so that the outer edge of the free end of the opening flap 17 cannot completely swivel to the outside, as is represented in FIG. 2 with reference to the radius R. In this case, the gas bag would directly press onto the opening flap 17 and kink the same between its supports (tether 51 and swiveling axis 31).

What is claimed is:

1. A gas bag module comprising:
   a gas bag,
   a module cover having at least one opening flap movable upon activation of said module,
   a tether between said at least one opening flap and a part of said gas bag module,
   an axis relative to which said opening flap is movable,
   said opening flap, in a closed state, having a lateral extension defining a first swiveling radius and, in an open condition of said module cover, being fixed to said module by means of said tether and being swiveling secured to said module cover in a region of said axis,
   said gas bag being provided with a deployment limiting device, which is configured such that, at the beginning of a deployment process, a portion of said gas bag is directed towards said tether, in order to contact said tether and to press onto said tether, and
   said axis, said gas bag, said deployment limiting device and said tether being arranged with respect to said opening flap in such a manner and said opening flap having such a strength that a geometry of said opening flap is changed by said tether when said opening flap is swiveled open so that said opening flap moves outwardly by a smaller amount than said first swiveling radius.

2. The gas bag module as claimed in claim 1, wherein between said axis and said tether said opening flap has a predetermined bending point, about which said opening flap is bent when opened.

3. The gas bag module as claimed in claim 2, wherein said axis corresponds to a provided film hinge, said opening flap being bent about said film hinge.

4. The gas bag module as claimed in claim 2, wherein said bending point and said tether are arranged with respect to each other such that an outer edge of said opening flap moves along a substantially elliptical path when said flap is opened.

5. The gas bag module as claimed in claim 1, wherein between said axis and said tether a plurality of predetermined bending points is provided.

6. The gas bag module as claimed in claim 1, wherein said axis is a stationary swiveling axis.

7. The gas bag module as claimed in claim 6, wherein said swiveling axis is formed by a film hinge.

8. The gas bag module as claimed in claim 6, wherein in a bent condition said opening flap swivels outwardly about said axis.

9. The gas bag module as claimed in claim 1, wherein said deployment limiting device is a strap wound around said gas bag in a folded state, said strap tearing during a deployment process.

10. The gas bag module as claimed in claim 1, wherein as emblem mounted on an outside of said opening flap is provided, said tether being mounted to an inner side of said opening flap in a region of said emblem.

11. A gas bag module comprising:

- a module cover which has at least one opening flap movable upon activation of said module,
- a swiveling axis relative to which said opening flap moves when said opening flap is opened and which is located on a side wall of said module cover,
- a predetermined bending point at a transition of said opening flap to said side wall, and
- a tether being between said at least one opening flap and a part of said gas bag module,
- said opening flap in a closed state having a lateral extension defining a first swiveling radius, and, in an open condition of said module cover, being fixed to said module by means of said tether and being swiveling secured to said module cover in a region of said axis, and
- said axis and said tether being arranged with respect to said opening flap in such a manner and said opening flap having such a strength that a geometry of said opening flap is changed by said tether when said opening flap is swiveled open so that said opening flap moves such that said predetermined bending point is moved outwardly relative to said side wall, so that said opening flap moves outwardly by a smaller amount than said first swiveling radius.

12. A gas bag module comprising:

- a gas bag provided with a deployment limiting device,
- a module cover having at least one opening flap movable upon activation of said module, said opening flap having a lateral extension in a closed state defining a first swiveling radius,
- said opening flap moving relative to a swiveling axis located on said gas bag module when said opening flap is opened,
- and a tether being provided between said at least one opening flap and a part of said gas bag module,
- said deployment limiting device directing at least a portion of said gas bag towards said tether upon activation of said gas bag module at a beginning of a deployment process, and
- said portion of said gas bag contacting said tether and exerting a force on said tether and said gas bag and said tether effecting a geometric deformation of said opening flap, so that said opening flap moves outwardly by a smaller amount than said first swiveling radius.

* * * * *